(12) United States Patent
Joshi et al.

(10) Patent No.: US 7,987,266 B2
(45) Date of Patent: Jul. 26, 2011

(54) FAILOVER IN PROXY SERVER NETWORKS

(75) Inventors: Chandrajit Gangadhar Joshi, Kothrud Pune (IN); Romil J Shah, Kothrud Pune (IN)

(73) Assignee: International Business Machines Corporation, Armonk, NY (US)

( * ) Notice: Subject to any disclaimer, the term of this patent is extended or adjusted under 35 U.S.C. 154(b) by 147 days.

(21) Appl. No.: 12/181,381

(22) Filed: Jul. 29, 2008

(65) Prior Publication Data
US 2010/0030880 A1 Feb. 4, 2010

(51) Int. Cl.
*G06F 15/173* (2006.01)
(52) U.S. Cl. ......... 709/225; 709/224; 709/245; 714/100
(58) Field of Classification Search .................. 709/225, 709/224, 245; 714/100
See application file for complete search history.

(56) References Cited

U.S. PATENT DOCUMENTS

| | | | |
|---|---|---|---|
| 6,335,937 B1 | 1/2002 | Chao et al. | |
| 6,708,187 B1 * | 3/2004 | Shanumgam et al. | ................ 1/1 |
| 6,859,834 B1 | 2/2005 | Arora et al. | |
| 7,107,355 B2 * | 9/2006 | Bethmangalkar et al. | .... 709/245 |
| 2002/0032883 A1 * | 3/2002 | Kampe et al. | ................... 714/16 |

* cited by examiner

*Primary Examiner* — Kyung-Hye Shin
(74) *Attorney, Agent, or Firm* — The Brevetto Law Group

(57) ABSTRACT

A system for servicing a request from a client includes at least two proxy servers, each having a corresponding proxy server configured as a buddy proxy server, and being adapted to act as a primary proxy server for servicing the request and to forward the request to a backend server. The system includes a load balancer adapted to: forward the request to a primary proxy server; forward the request to a failover proxy server in the event of failure of the primary proxy server; and forward a response from the primary proxy server or the failover proxy server to the client. The system includes a backend server adapted to receive a request from a proxy server and to send a response to the proxy server. The failover proxy server is adapted to process the request depending on a status of a matching previously stored request.

20 Claims, 11 Drawing Sheets

FAILOVER IN PROXY SERVER NETWORKS

BACKGROUND

In computer networks, a proxy server is a server (which can refer to a physical computer system or a process running thereon) which services the requests of its clients by forwarding requests to other servers. A client (which can also refer to a physical computer system or, more commonly, an application running thereon) connects to the proxy server, requesting some service, such as a file, connection, web page, or other resource, available from a different server known as a backend server. The proxy server (often simply 'proxy') provides the resource by connecting to the specified backend server and requesting the service on behalf of the client.

Currently, in a proxy network, failover support between proxies is provided by creating an additional 'failover' proxy server that is identical to the first or 'primary' proxy server. The proxy servers have no knowledge of each other and must be managed through a process known as a load balancer. A load balancer has a virtual host name that client applications use when sending service requests such as updates to a directory using the Lightweight Directory Access Protocol (LDAP). The load balancer is configured to send those requests to the primary proxy server. If that proxy server is down, or unavailable because of a network failure, the load balancer sends the requests to the failover proxy server until the primary proxy server is back on line and available.

In a load-balanced proxy environment, if the primary proxy server fails, the first request sent to it fails and returns an error. All subsequent requests are sent to the failover proxy server. The first request that failed is typically retried (the "auto-retry" mechanism), but is not necessarily sent to the failover server. This may return an error or corrupt the directory in some failure scenarios. This is explained with reference to the proxy network 100 illustrated in FIG. 1.

In FIG. 1, the proxy server 130 is the primary proxy to which the requests are routed and proxy server 140 is the failover proxy. In such a situation, the normal flow of requests from the client 110 is client 110->load balancer 120->primary proxy server 130->one of the backend servers 150, 170 (as illustrated, 150 ), each of which services a database 160, 180 respectively. This flow of requests is shown by arrows 101, 102 and 103 respectively. The normal flow of response would be backend server 150->primary proxy server 130->load balancer 120->client 110, as shown by the arrows 104, 105 and 106 respectively. If the primary proxy 130 fails, the request would be routed to the failover proxy server 140 and thence to backend server 150. The flow of request and response in the failover scenario is shown using dashed arrows 102a, 103a, 104a and 105a.

Now assume that client 110 has issued a LDAP Modify request to alter database 160. The load balancer 120 has forwarded that request to the primary proxy server 130 which has in turn forwarded it to backend server 150 and the request is outstanding, in the sense that backend server 150 is still processing the request and is yet to send the response back. In such a situation, if the primary proxy server 130 fails, then load balancer 120 will get an error, either by timing out while waiting for a response, or as a result of a periodic polling action. The request will then be retried with the failover proxy server 140. So the following things may happen because the same request will be processed twice by the same backend server 150:

In the case of LDAP ADD requests, the client 110 will get an LDAP_ALREADY_EXISTS error.

In the case of LDAP DELETE requests, the client 110 will get an LDAP_NO_SUCH_OBJECT error.

In case of LDAP MODIFY requests, the database 160 may get corrupted.

SUMMARY

Disclosed are arrangements which may configure at least two proxy servers in a proxy network as "buddies" that exchange "checkpoint" messages about the status of requests/ responses they are servicing. Requests that may be retried because of the failure of one proxy server are flagged as such so that a "buddy" of that proxy, receiving the "retry request", can examine the last known status of the corresponding failed request, and may process the retry request accordingly.

According to a first aspect, there is provided a system for servicing a request from a client, the system comprising at least two proxy servers, each proxy server having a corresponding proxy server configured as a buddy proxy server, each proxy server being adapted to act as a primary proxy server for servicing the request and to forward said request to a backend server; a load balancer adapted to: forward the request to a primary proxy server; forward the request, with a corresponding flag set, to a failover proxy server that is configured as the buddy proxy server to the primary proxy server, in the event of failure of the primary proxy server; and forward a response from the primary proxy server or the failover proxy server to the client; and a backend server adapted to a request from a proxy server and to send a response to the proxy server from which the request was received, wherein the failover proxy server is adapted to process the request depending on a status in the processing by the primary proxy server of a matching previously stored request.

According to a second aspect, there is provided a method of servicing, by a proxy server in a proxy network, a request in a proxy network, the method comprising determining, by a proxy server on receipt of the request, whether the request matches a previously stored request; determining, if a match was found, the status in the processing by a buddy proxy server to the proxy server of a matching previously stored request; and servicing the request depending on the determined status.

According to a third aspect, there is provided a method of servicing, by a backend server in a proxy network, a request, the method comprising determining, if the request is a status discovery request, whether the request matches a retained request and corresponding response in a retained request list; sending, if a match is found, the corresponding response to the entity from which the status discovery request was received; determining, if a match is not found, whether the request matches a request in an outstanding request list; and sending, if a match is found, a response to the matching request to an entity from which the status discovery request was received.

According to another aspect, there is provided a computer program product including a computer readable medium having recorded thereon a computer program for implementing any one of the methods described above.

Other aspects are also disclosed.

DETAILED DESCRIPTION

Figure 1:
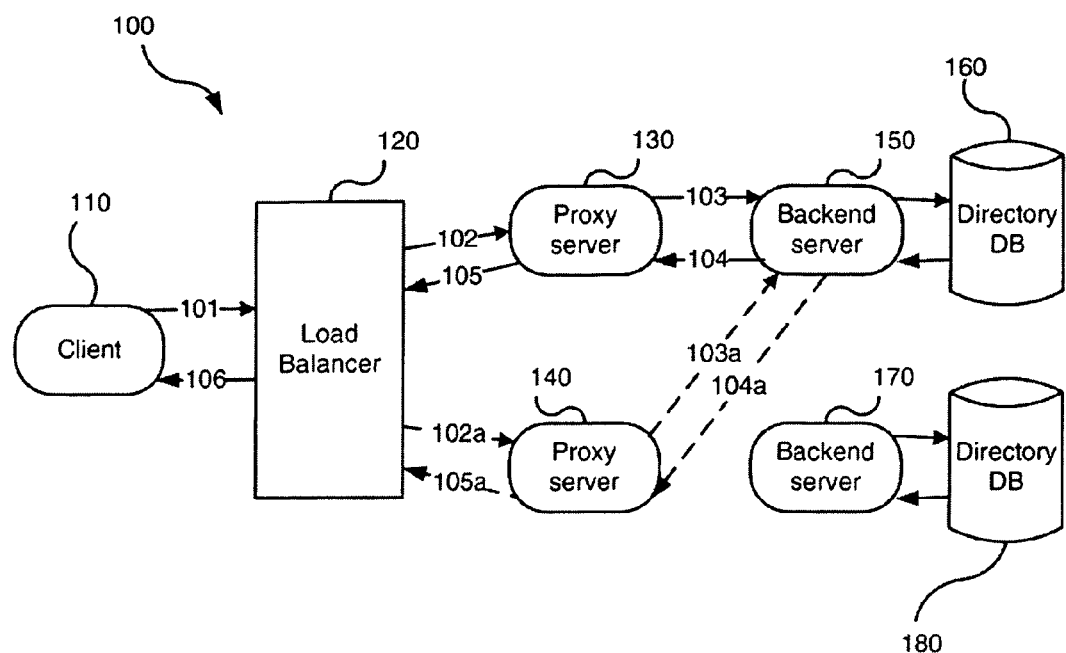
FIG. 1 shows a failover proxy network with dataflow according to a prior art arrangement.

Where reference is made in any one or more of the accompanying drawings to steps and/or features, which have the same reference numerals, those steps and/or features have for the purposes of this description the same function(s) or operation(s), unless the contrary intention appears.

Figure 2:
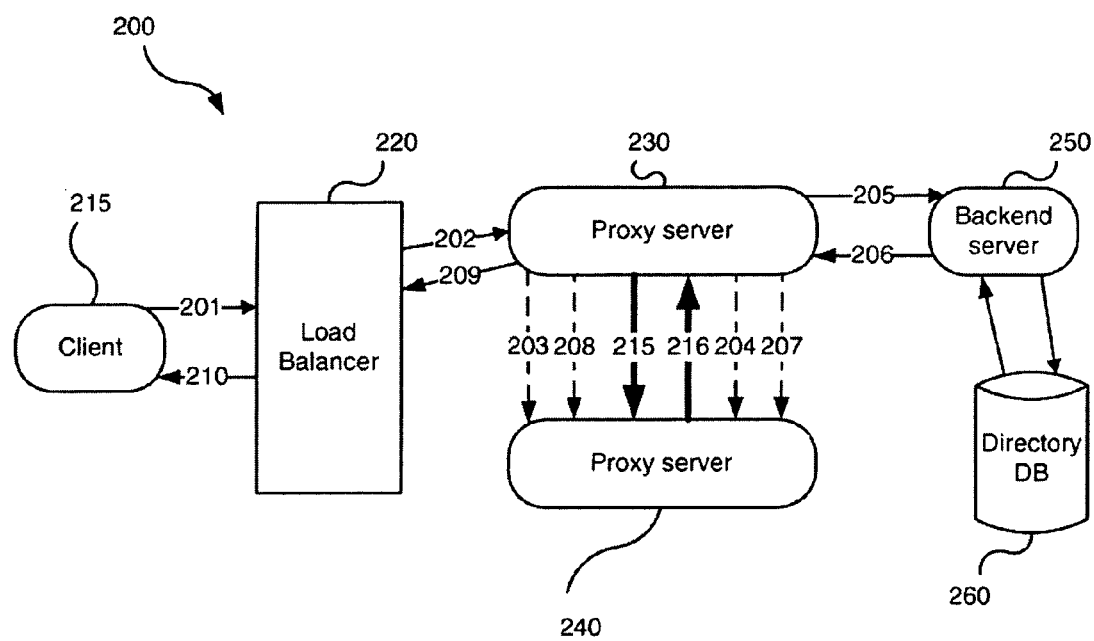
FIG. 2 shows a failover proxy network with dataflow under normal operation according to one embodiment of the invention.

FIG. 2 shows a proxy network 200 with failover according to one arrangement. The database 260 may operate in a similar fashion to the database 160 in the proxy network 100 of FIG. 1. The operation of the client 215, load balancer 220, proxy servers 230 and 240, and backend server 250 is modified compared to the operation of client 110, load balancer 120, proxy servers 130 and 140, and backend server 150 as described in detail below.

Figure 3:
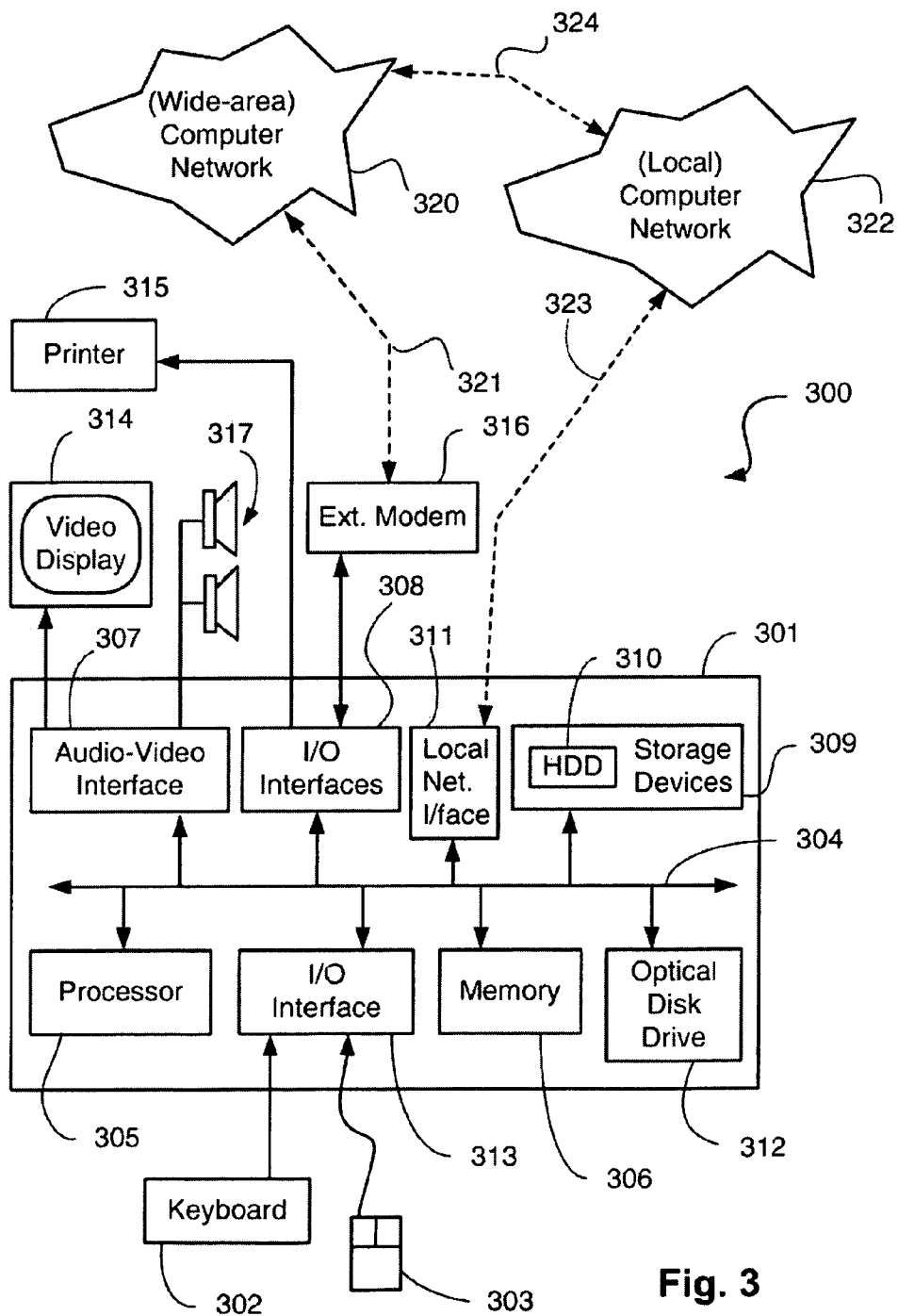
FIG. 3 is a schematic block diagram of a general purpose computer upon which am embodiment described herein can be practiced.

Each of client 215, load balancer 220, proxy servers 230 and 240, and backend server 250 may be implemented as a process being executed on a computer system 300, such as that shown in FIG. 3. The respective processes may be implemented as software, such as one or more application programs executable within the computer system 300. In particular, the steps of each process may be affected by instructions in the software that are carried out within the computer system 300. The instructions may be formed as one or more code modules, each for performing one or more particular tasks. The software may also be divided into two separate parts, in which a first part and the corresponding code modules may perform the disclosed processes and a second part and the corresponding code modules manage a user interface between the first part and the user. The software may be stored in a computer readable medium, including the storage devices described below, for example. The software may be loaded into the computer system 300 from the computer readable medium, and may be executed by the computer system 300. A computer readable medium having such software or computer program recorded on it is a computer program product. The use of the computer program product in the computer system 300 may affect an apparatus for servicing requests in a computer network.

As seen in FIG. 3, in an arrangement, the computer system 300 is formed by a computer module 301, input devices such as a keyboard 302 and a mouse pointer device 303, and output devices including a printer 315, a display device 314 and loudspeakers 317. An external Modulator-Demodulator (Modem) transceiver device 316 may be used by the computer module 301 for communicating to and from the network 320 via a connection 321. The network 320 may be a wide-area network (WAN), such as the Internet, or a private WAN. Where the connection 321 is a telephone line, the modem 316 may be a traditional "dial-up" modem. Alternatively, where the connection 321 is a high capacity (eg: cable) connection, the modem 316 may be a broadband modem. A wireless modem may also be used for wireless connection to the network 320.

The computer module 301 may include at least one processor unit 305, and a memory unit 306 for example formed from semiconductor random access memory (RAM) and read only memory (ROM). The module 301 may also include a number of input/output (I/O) interfaces including an audio-video interface 307 that couples to the video display 314 and loudspeakers 317, an I/O interface 313 for the keyboard 302 and mouse 303, and an interface 308 for the external modem 316 and printer 315. In some implementations, the modem 316 may be incorporated within the computer module 301, for example within the interface 308.

The computer module 301 may also have a local network interface 311 which, via a connection 323, permits coupling of the computer system 300 to a local computer network 322, known as a Local Area Network (LAN). As also illustrated, the local network 322 may also couple to the wide network 320 via a connection 324, which would typically include a so-called "firewall" device or similar functionality. The interface 311 may be formed by an Ethernet™ circuit card, a wireless Bluetooth™ or an IEEE 802.11 wireless arrangement. Either of networks 320 and 322, or both together, could make up the network 200 illustrated in FIG. 2.

The interfaces 308 and 313 may afford both serial and parallel connectivity, the former typically being implemented according to the Universal Serial Bus (USB) standards and having corresponding USB connectors (not illustrated). Storage devices 309 are provided and typically include a hard disk drive (HDD) 310. Other devices such as a floppy disk drive and a magnetic tape drive (not illustrated) may also be used. An optical disk drive 312 may be provided to act as a non-volatile source of data. Portable memory devices, such optical disks (eg: CD-ROM, DVD), USB-RAM, and floppy disks for example may be used as appropriate sources of data to the system 300.

The components 305 to 313 of the computer module 301 may communicate via an interconnected bus 304 and in a manner which results in a conventional mode of operation of the computer system 300 known to those in the relevant art. Examples of computers on which the described arrangements can be practised include IBM-PC's and compatibles, Sun Sparcstations, Apple Mac™ or like computer systems evolved therefrom.

The application programs discussed above may be resident on the hard disk drive 310 and read and controlled in execution by the processor 305. Intermediate storage of such programs and any data fetched from the networks 320 and 322 may be accomplished using the semiconductor memory 306, possibly in concert with the hard disk drive 310. In some instances, the application programs may be supplied to the user encoded on one or more CD-ROM and read via the corresponding drive 312, or alternatively may be read by the user from the networks 320 or 322. Still further, the software can also be loaded into the computer system 300 from other computer readable media. Computer readable media refers to any storage medium that participates in providing instructions and/or data to the computer system 300 for execution and/or processing. Examples of such media include floppy disks, magnetic tape, CD-ROM, a hard disk drive, a ROM or integrated circuit, a magneto-optical disk, or a computer readable card such as a PCMCIA card and the like, whether or not such devices are internal or external of the computer module 301. Examples of computer readable transmission media that may also participate in the provision of instructions and/or data include radio or infra-red transmission channels as well as a network connection to another computer or networked device, and the Internet or Intranets including e-mail transmissions and information recorded on Websites and the like.

The second part of the application programs and the corresponding code modules mentioned above may be executed to implement one or more graphical user interfaces (GUIs) to be rendered or otherwise represented upon the display 314. Through manipulation of the keyboard 302 and the mouse 303, a user of the computer system 300 and the application may manipulate the interface to provide controlling commands and/or input to the applications associated with the GUI(s).

The disclosed processes may alternatively be implemented in dedicated hardware such as one or more integrated circuits performing the functions or sub functions of the disclosed processes. Such dedicated hardware may include graphic processors, digital signal processors, or one or more microprocessors and associated memories.

Definitions of Terms:

The following definitions define the key terms used in the present disclosure:
1. Buddy Processes: Two processes are termed buddy processes when in case of a failure of either of them, the other one can take over the processing of all the outstanding requests that were being serviced by the failed process when it was alive.
2. Checkpoint Message: A message sent by a process to its buddy at a strategic point in the request processing so that the buddy process can update its data structures with the information about the status of the request being serviced by the original process.
3. Buddy Port: A configurable port on which a buddy proxy listens to the checkpoint messages from the other buddy proxy.
4. "Retry Indicator" flag: A flag set by the retrying entity (see below) before sending the request to the failover proxy server to indicate that the request is being retried.
5. Request ID: A unique request ID generated by the retrying entity, which is included in the original as well as a corresponding retry request. This is used by the buddy proxy of a failed primary proxy to match the retry request with previous requests.
6. "Retain Request" flag: A special flag set by a proxy server while forwarding a "database change" request to a backend server. In the LDAP, such requests are ADD, DELETE, and MODIFY. This flag serves the purpose of indicating to the backend server to retain the request and its response if it gets an error before or during sending the reply back to the proxy server. This situation will especially arise when the proxy server fails while the request is being processed by the backend server.
7. "Request Status Extended Operation" (Or "Request Status ExOp") request: "Request Status ExOp" is a request sent by a failover proxy to the backend server in case of a failure of the primary proxy. It serves the purpose of discovering the current status of a database change request and if possible getting the corresponding response.
8. "Retained Request List": A list, maintained by the backend server, of requests and their corresponding responses that could not be sent back to the proxy server because of the failure of the latter.

The retrying entity could either be the load balancer 220 or the client 215. If the client 215 is the retrying entity, then the appropriate changes to the process of client 110 are to support the auto-retry mechanism, to set the unique "Request ID" for each request, and to set the "Retry Indicator" flag in each retry request. On the other hand, if load balancer 220 is the retrying entity, the process of load balancer 120 only need to be changed to set a unique "Request ID" in each request and to set the "Retry Indicator" flag in each retry request. In all the scenarios described below, it is assumed that load balancer 220 is the retrying entity.

The "Request ID" may be generated by the retrying entity based on the combination of timestamp and a random number so as to make it unique across all the requests that are being serviced by the server network 200. The same request ID may be included in both the original request and the corresponding retry request. The proxy server servicing the request may propagate the "Request ID" and also set the "Retain Request" flag in the request (if it is a "database change" request) before forwarding it to the appropriate backend server. The request ID and the "Retain Request" flag may be used by the backend server in certain cases of proxy server failure. This is explained in more detail below with reference to Failure Scenario 3.

Two proxy servers may be configured as buddies of each other by maintaining special TCP/IP connections between them. Hence in FIG. 2, proxy server 230 may maintain a TCP/IP connection with proxy server 240 by binding to its configurable buddy port, and vice versa, so that in case of a failure of either one of them, the other proxy server may know about it. Arrows 215 and 216 in FIG. 2 represent TCP/IP connection messages between proxies 230 and 240, establishing them as buddies. Arrow 215 illustrates a message which establishes a TCIP/IP connection with proxy 240, and includes information about proxy 230. Proxy 240 stores the information and responds with a message, illustrated by arrow 216, establishing a TCP/IP connection with proxy 230 and including information about proxy 240, which is stored by proxy 230. In an embodiment, all the subsequent communication between proxy 230 and proxy 240 may occur through the special TCP/IP connections established between them.

Note that checkpoint messaging between two proxies may happen when they are configured as buddies of each other as described above. The checkpoint messages may be useful for the failover proxy in case of failure of the primary proxy, because the failover proxy can take over the job of request processing from the appropriate point and thereby reduce data corruption and error conditions.

The checkpoint messaging may be enabled only for requests that change the directory database (like LDAP ADD, DELETE or MODIFY). For SEARCH requests, the checkpoint messaging may not be necessary because the failover can be better achieved by the auto-retry mechanism alone, hence avoiding the marginal performance degradation that results from the buddy processing and checkpoint messaging arrangements according to one embodiment.

When the two proxies 230 and 240 are configured as buddies of each other, proxy 230 may send, for each database change request proxy 230 receives, checkpoint messages to proxy 240 at strategic points in the request processing. Also, for each database change request proxy 240 receives, proxy 240 may send checkpoint messages to proxy 230. Hence, in case of failure of either proxy, its buddy proxy can immediately take over the processing from the point indicated by the most recent checkpoint message.

A checkpoint message includes:
1. Information about the client 215.
2. Type of request (e.g. ADD, MODIFY etc.).

3. Type of checkpoint message.
4. The unique "Request ID" of the request, originally set by client 215 or load balancer 220.
5. Context information about the request.
6. Request data.

In the above list, items 1, 2, 3, 4 and 5 could be termed as request header information and item 6 is the actual content information of the request/response. The type of checkpoint message (CM) is one of the following, each of which is sent at a different point in the proxy processing, as described below:
1. "New Request"
2. "Backend Processing"
3. "Backend Reply"
4. "Reply to Client"

FIG. 2 shows the data flow of a 'database change' request from client 215 to backend server 250 and the response from backend server 250 in proxy network 200 under normal operation, i.e. a no-failure scenario, according to the disclosed arrangements. FIG. 2 also shows corresponding checkpoint messages from proxy 230 to proxy 240. The request originates as a message from client 215 to load balancer 220 as shown by arrow 201. Load balancer 220 can choose either proxy 230 or 240 as the primary proxy according to known methods of load balancing. The non-chosen proxy may be referred to as the failover proxy. In the following discussion, proxy 230 is assumed to have been chosen as the primary proxy. When proxy 230 receives the 'database change' request from load balancer 220, as shown by arrow 202, it may send a checkpoint message to buddy proxy 240. This is known as "New Request" CM, shown as arrow 203. The request may travel within the proxy 230 and reach a point when it is about to be forwarded to the backend server 250. At this point, proxy 230 may send a "Backend Processing" CM, shown by arrow 204, to buddy proxy 240. Proxy 230 may set "Retain Request" flag within the request structure and forwards the request to the backend server 250, as shown by arrow 205. When the backend server 250 sends the response back (arrow 206), proxy 230 may send a "Backend Reply" CM along with the response sent by the backend sever 250 to buddy proxy 240, as shown by arrow 207. Finally, proxy 230 may send the response back to the load balancer 220 (arrow 209) and update buddy proxy 240 with a "Reply to Client" CM (shown by arrow 208). Load balancer 220 may complete the service by forwarding the response to the client 215, as shown by arrow 210. On receipt of each checkpoint message, buddy proxy 240 may allocate (for "New Request" type CMs), updates (for "Backend Processing" or "Backend Reply" type CMs), or deallocate (for "Reply to Client" type CMs) internal data structures corresponding to the included "Request ID" to keep them current with the context information of the request.

The above discussed processing logic will also work well for the requests occurring under transactions, in the sense that if a request under transaction is routed to proxy 230 and proxy 230 fails while processing it, proxy 240 will be able to provide failover support without a need for the client 215 to roll back the transaction.

Figure 4:
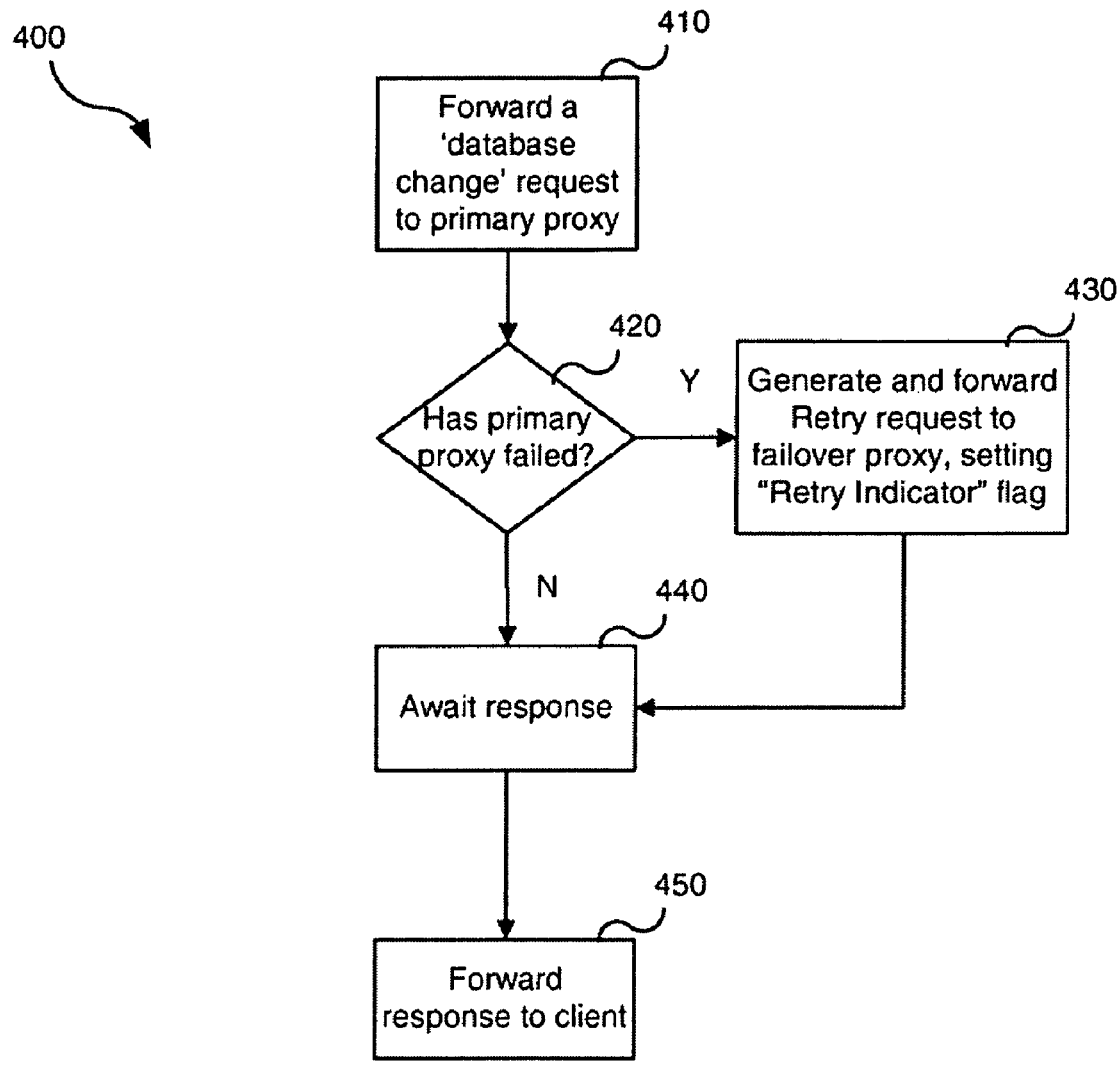
FIG. 4 contains a flowchart illustrating an embodiment of a method of operation of the load balancing server of FIG. 2.

FIG. 4 contains a flowchart illustrating an embodiment of a method 400 of operation of the load balancing server 220 according to the disclosed arrangements. Method 400 may begin at step 410 where load balancer 220 forwards a 'database change' request from the client 215 to the primary proxy 230 (for consistency with the data flow illustrated in FIG. 2). At decision step 420, load balancer 220 may determine whether primary proxy 230 has failed. If so, method 400 may proceed to step 430, where the load balancer 220 may generate a "retry request" by copying the original request, including its Request ID, and setting the "Retry Indicator" flag, and forward it to the failover proxy 240. Following this, or if decision step 420 returned "No", load balancer at step 440 may await a response from either primary proxy 230 or failover proxy 240 (depending on to which proxy server the request was forwarded). The response may be forwarded to the client 215 at step 450, after which method 400 may conclude.

Figure 5:
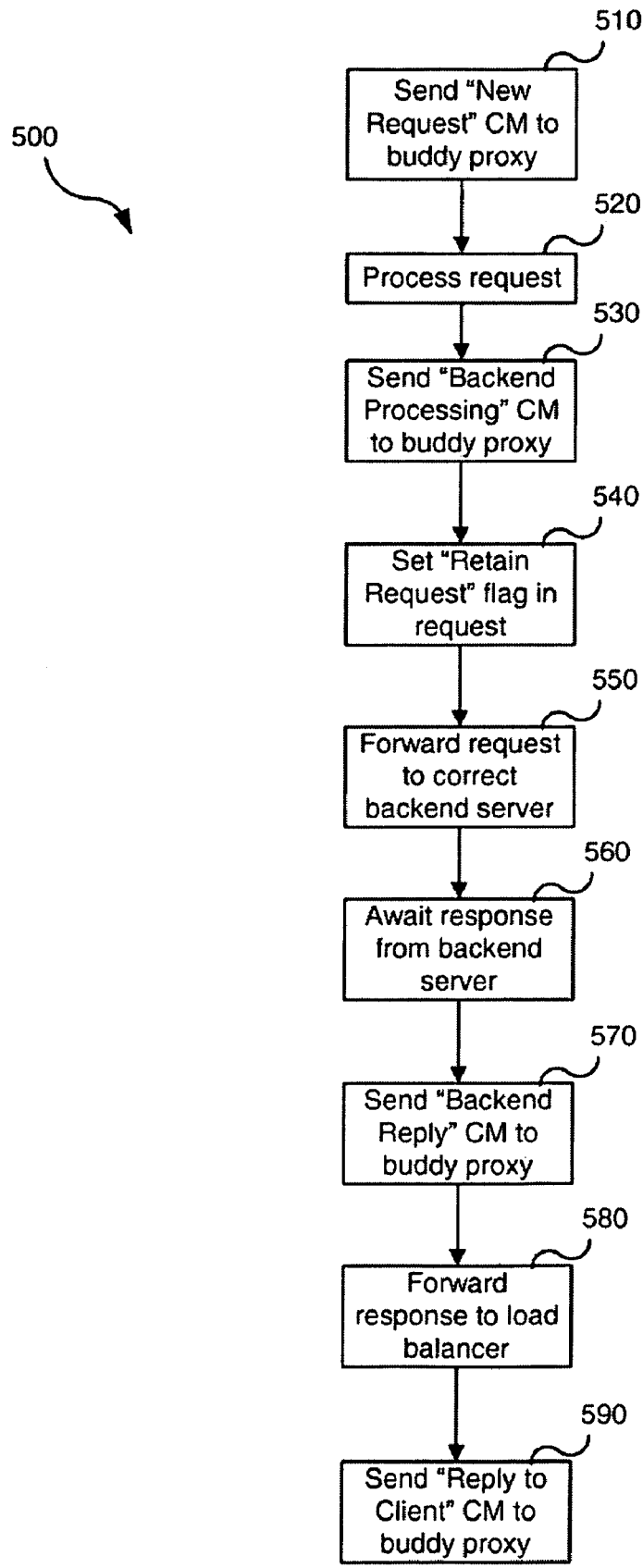
FIG. 5 contains a flowchart illustrating an embodiment of a method of operation of the primary proxy server of FIG. 2.

FIG. 5 contains a flowchart illustrating an embodiment of a method 500 of operation of the primary proxy 230 in response to the receipt of a new request, according to the disclosed arrangements. Method 500 may begin at step 510 where primary proxy 230 may send a "New Message" CM to its buddy proxy 240. Step 520 follows, at which primary proxy 230 may process the request. When processing is complete, primary proxy 230 may send a "Backend Processing" CM to its buddy proxy 240. Step 540, at which primary proxy 230 may set the "Retain Request" flag in the request, follows, after which primary proxy 230 may forward the request to the correct backend server 250 (for consistency with FIG. 2) in step 550. After awaiting the response at step 560, primary proxy 230 may send a "Backend Reply" CM to buddy proxy 240 at step 570. In the next step 580, primary proxy 230 may forward the response to load balancer 220, and method may 500 conclude after step 590 where primary proxy 230 may send a "Reply to Client" CM to buddy proxy 240.

Figure 6:
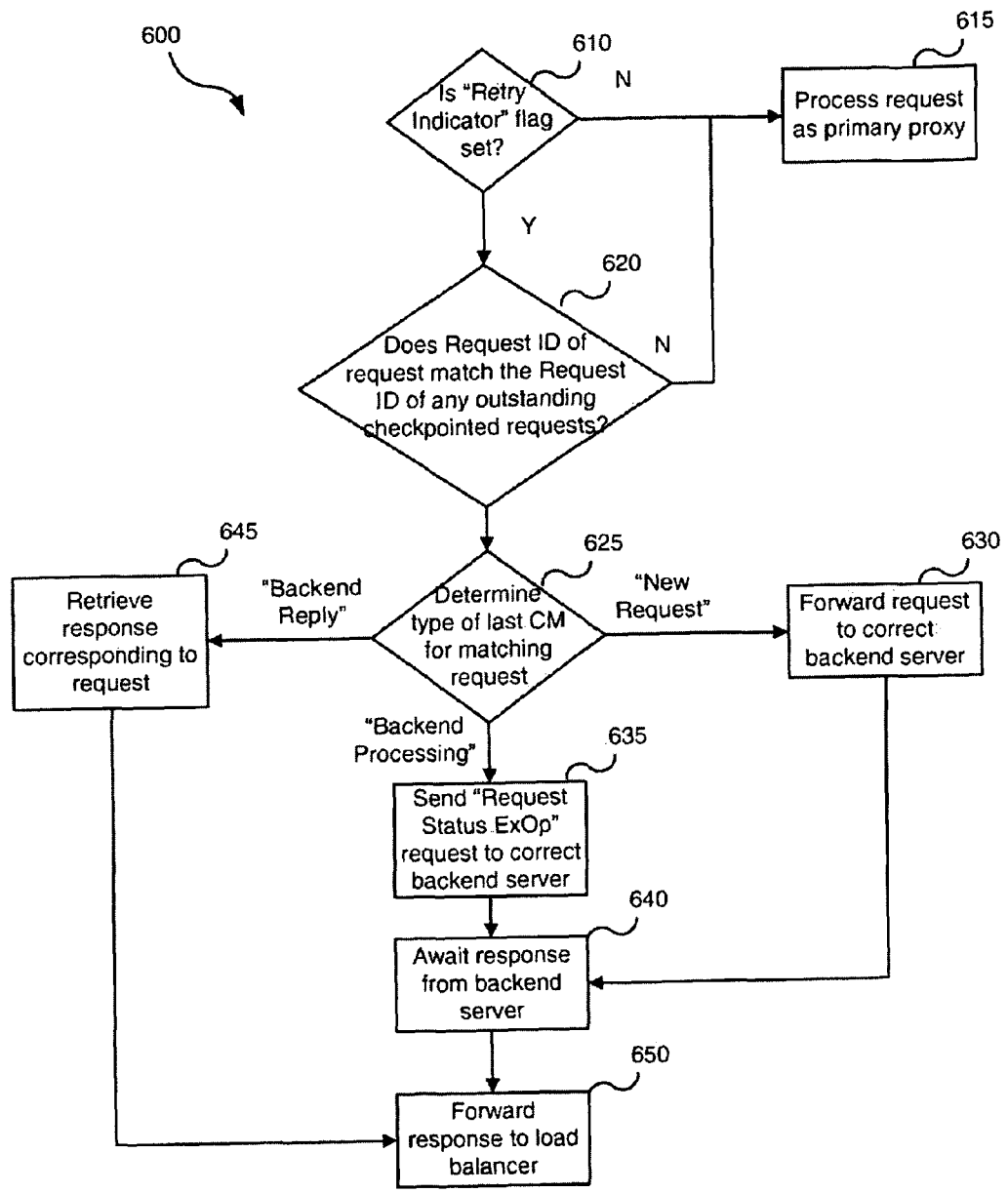
FIG. 6 contains a flowchart illustrating an embodiment of a method of operation of the failover proxy server of FIG. 2.

FIG. 6 contains a flowchart illustrating an embodiment of a method 600 of operation of the failover proxy 240 in response to a request from load balancer 220. Method 600 may start at step 610 where failover proxy 240 may examine the request to determine whether the "Retry Indicator" flag is set. If not, failover proxy 240 may infer the request is a normal one, and may process the request at step 615 using, for example, method 500, i.e. proxy 240 has now become the primary proxy for the request, and its buddy proxy 230 has become the failover proxy. If the "Retry Indicator" flag is set, at step 620 proxy 240 may examine its saved data structures to determine if the Request ID of the received request matches the Request ID of any outstanding Checkpointed Request, meaning a request for which proxy 240 has received CMs from primary proxy 230. If there is no match, proxy 240 may infer that primary proxy 230 failed after receipt of the request, before it could send the "New Request" CM to its buddy proxy 240 (Failure Scenario 1, described below). In this case proxy 240 may treat this request as any other normal request and may execute its normal request processing logic at step 615, as described above. If there is a matching request, method 600 may proceed to step 625 to determine the type of the last received CM corresponding to the matching request. If it is "New Request", proxy 240 may infer that proxy 230 failed while processing the request (step 520 of method 500) and before forwarding it to the correct backend server (Failure Scenario 2, described below). Proxy 240 may forward the request to the correct backend server 250 (for consistency with FIG. 2) in step 630, and may await the response from the backend server 250 at step 640. When the response is received, proxy 240 may forward the response to the load balancer 220 at step 650, after which method 600 may conclude.

If the matching request type is "Backend Processing", proxy 240 may infer that proxy 230 failed after forwarding the request to the backend server 250 in step 550 (Failure Scenario 3, described below). However, proxy 240 may not know whether the response from backend server 250 was a success or an error. So proxy 240 may format a "Request Status ExOp" request and may send it to backend server 250 at step 635. Along with this request, proxy 240 may also send the Request ID corresponding to the request. Proxy 240 may await the response from the backend server at step 640, and may proceed to forward the response to the load balancer 220 at step 650, after which method 600 may conclude. The response could be a success or an error message, as described below with reference to FIG. 7.

If the matching request type is "Backend Reply", proxy 240 may infer that proxy 230 failed while processing the response and before forwarding it to the load balancer 220 in step 580 (Failure Scenario 4, described below). Proxy 240 may retrieve the response corresponding to the request (received with the "Backend Reply" CM sent by proxy 230 at step 570) at step 645, and may forward it to the load balancer 220 at step 650, after which method 600 may conclude.

Note the absence of a decision box for a check of "type" ="Reply to Client" CM in FIG. 6. In an embodiment, this scenario may not arise because proxy 230 may send the response to the load balancer 220 before sending the "Reply to Client" CM to buddy proxy 240 (see steps 580 and 590 of method 500). Hence, even if proxy 230 failed after sending the reply to the load balancer 220, the load balancer 220 may not need to retry the request with the failover proxy 240 because it may have already received the response for the request. Hence, the failover proxy 240 may not find that its most recent CM is of type "Reply to Client".

Figure 7:
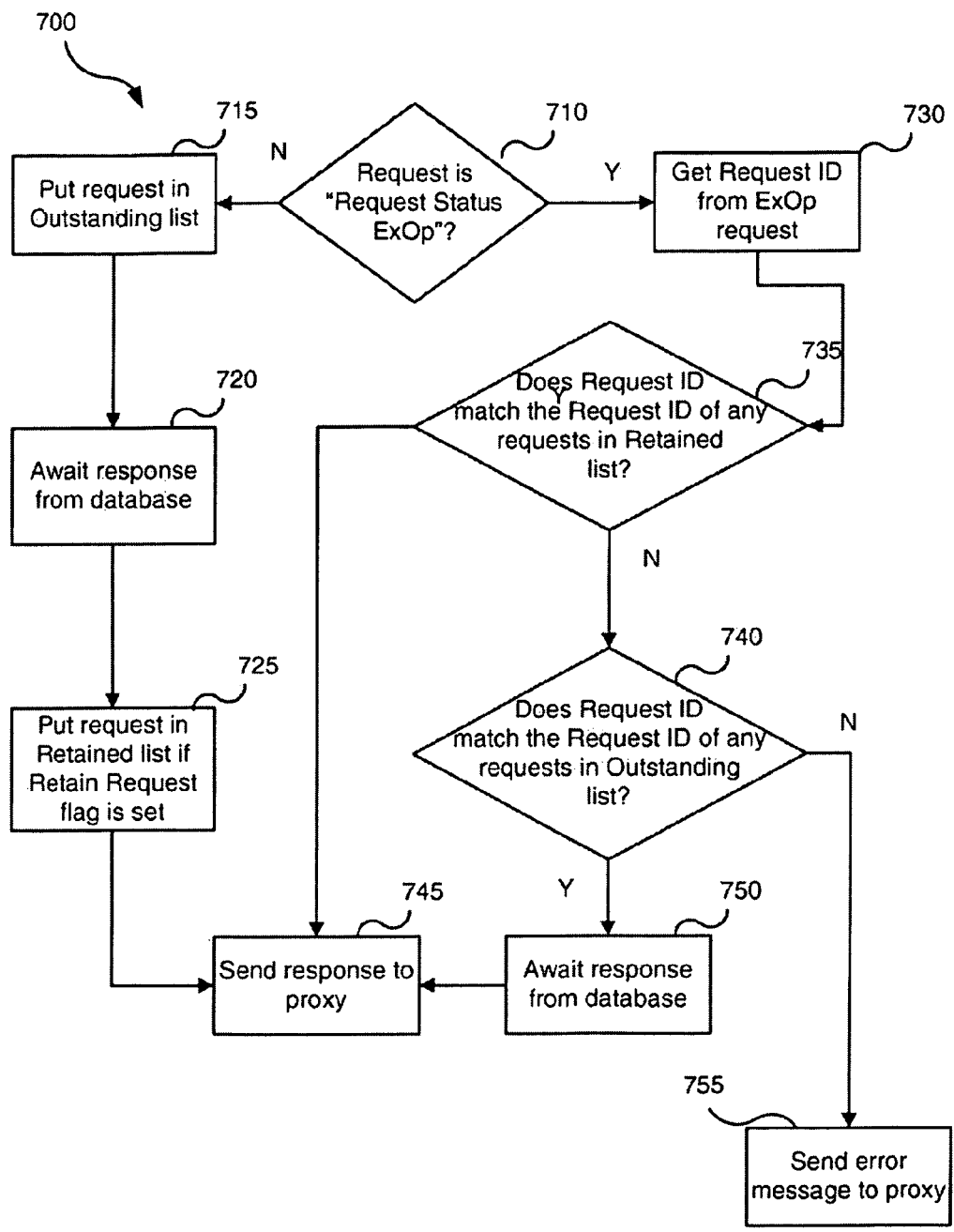
FIG. 7 contains a flowchart illustrating an embodiment of a method of operation of a backend server of FIG. 2.

FIG. 7 contains a flowchart illustrating an embodiment of a method 700 of operation of a backend server 250 in response to receipt of a request. Method 700 may begin at step 710 where backend server 250 may determine whether the request is a "Request Status ExOp" request. If it is not, backend server 250 in step 715 may put the request in its Outstanding Request list, a list of requests received but not yet completed. Backend server, at step 720, may await a response from its corresponding database 260 (for consistency with FIG. 2), before moving the request and the corresponding response to the Retained Request list if the Retain Request flag of the request is set, at step 725. At step 745 the backend server may send the response to the proxy from which the request was received, after which method 700 may conclude.

If the received request is a "Request Status ExOp" request, backend server at step 730 may obtain the Request ID of the request, before determining whether the determined Request ID matches the Request ID of any of the requests in the Retained Request List of the backend server 250 (step 735). If a match is found, in step 745 the backend server 250 may send the corresponding response to the proxy from which the request was received, after which method 700 may conclude.

If a match is not found at step 735, the backend server 250 may determine at step 740 whether the determined Request ID matches the Request ID of any of the requests in the Outstanding Request List of the backend server 250 (step 735). If so, the backend server may await the response from the database 260 at step 750, and may forward it at step 745 to the proxy from which the request was received, after which method 700 may conclude.

If no match was found at step 740, an error may have occurred, and an error message may be returned in step 755 to the proxy from which the request was received, after which method 700 may conclude.

Figure 8:
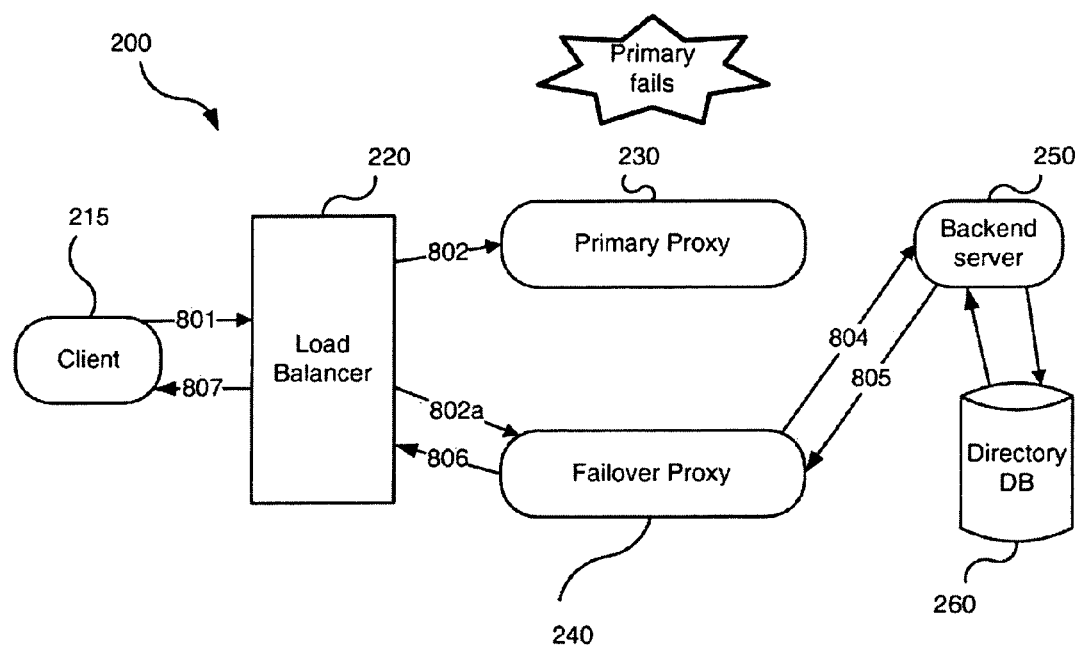
FIG. 8 shows the failover proxy network of FIG. 2 with dataflow under Failure Scenario 1.

FIG. 8 shows an embodiment of the failover proxy network 200 with dataflow under Failure Scenario 1 as implemented by the embodiments of methods 400 to 700 described above. The flow of a request from the client 215 is client 215->load balancer 220→primary proxy 230, as shown by arrows 801 and 802. Primary proxy 230 fails, causing load balancer 220 to generate a retry request to the failover proxy 240, which then forwards it to backend server 250, as indicated by arrows 802a, 803. The flow of response is backend server 250->failover proxy 240->load balancer 220->client 215, as shown by the arrows 805, 806 and 807 respectively.

Figure 9:
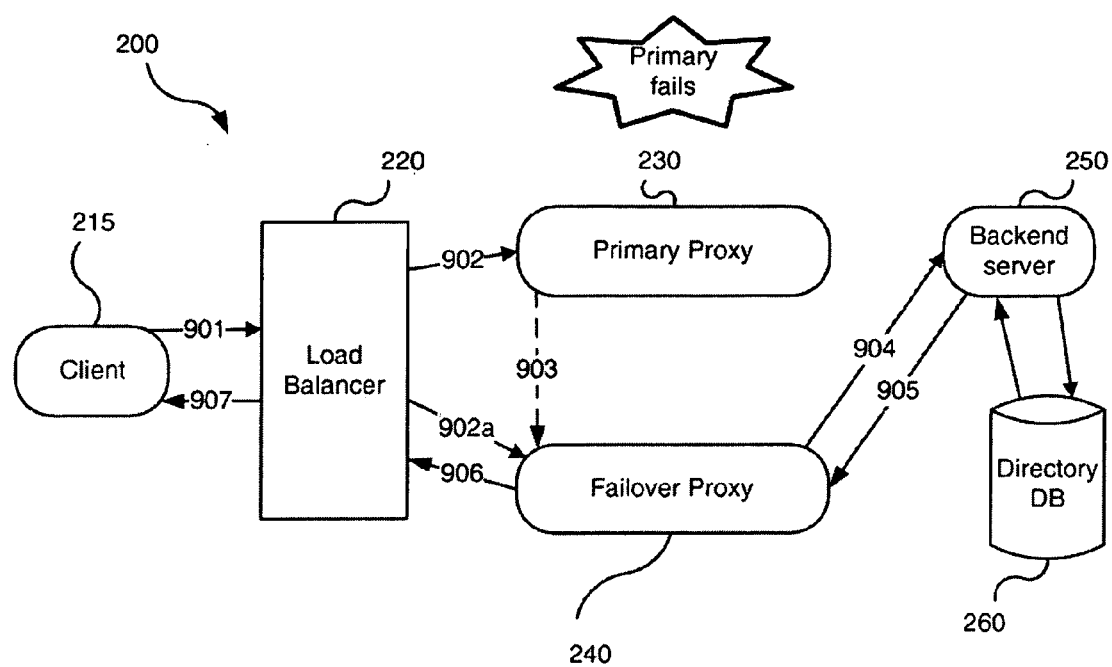
FIG. 9 shows the failover proxy network of FIG. 2 with dataflow under Failure Scenario 2.

FIG. 9 shows an embodiment of the failover proxy network 200 with dataflow under Failure Scenario 2 as implemented by the embodiments of methods 400 to 700 described above. The flow of a request from the client 215 is client 215->load balancer 220→primary proxy 230, as shown by arrows 901 and 902. Primary proxy 230 then fails after sending a "New Request" CM to failover proxy 240 as shown by arrow 903, causing load balancer 220 to generate a retry request to the failover proxy 240, which then forwards it to backend server 250, as indicated by arrows 902a, 904. The flow of response is backend server 250->failover proxy 240->load balancer 220->client 215, as shown by the arrows 905, 906 and 907 respectively.

Figure 10:
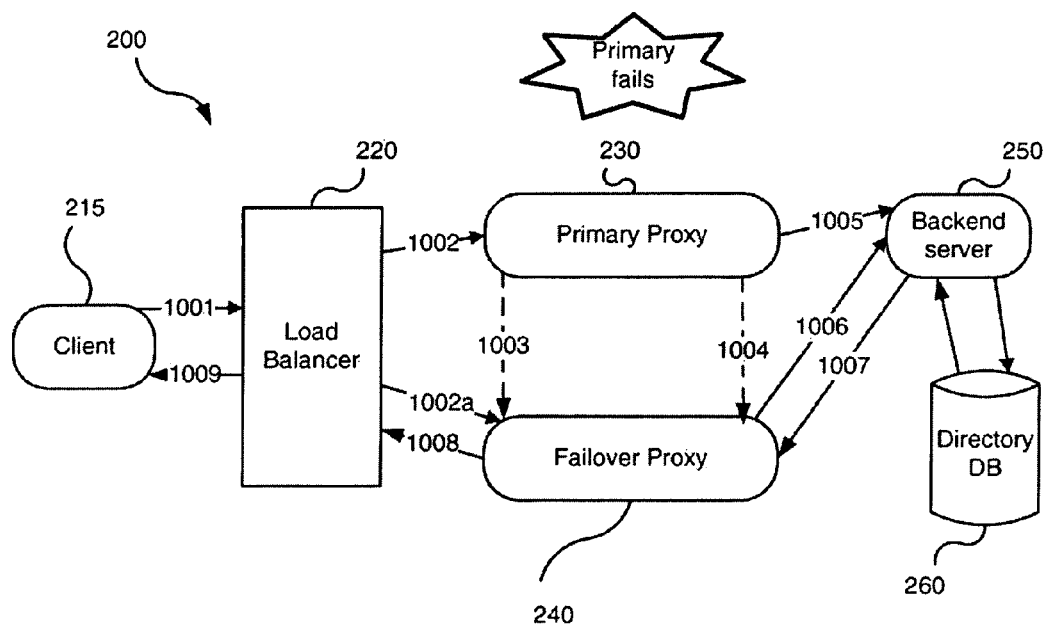
FIG. 10 shows the failover proxy network of FIG. 2 with dataflow under Failure Scenario 3.

FIG. 10 shows an embodiment of the failover proxy network 200 with dataflow under Failure Scenario 3 as implemented by the embodiments of methods 400 to 700 described above. The flow of a request from the client 215 is client 215->load balancer 220→primary proxy 230->backend server 250, as shown by arrows 1001, 1002, and 1005. Primary proxy 230 then fails after sending a "New Request" CM and a "Backend Processing" CM to failover proxy 240 as shown by arrows 1003, 1004. This causes load balancer 220 to generate a retry request to the failover proxy 240, which then forwards a "Request Status ExOp" request to backend server 250, as indicated by arrows 1002a, 1006. The flow of response is backend server 250->failover proxy 240->load balancer 220→client 215, as shown by the arrows 1007, 1008 and 1009 respectively.

Figure 11:
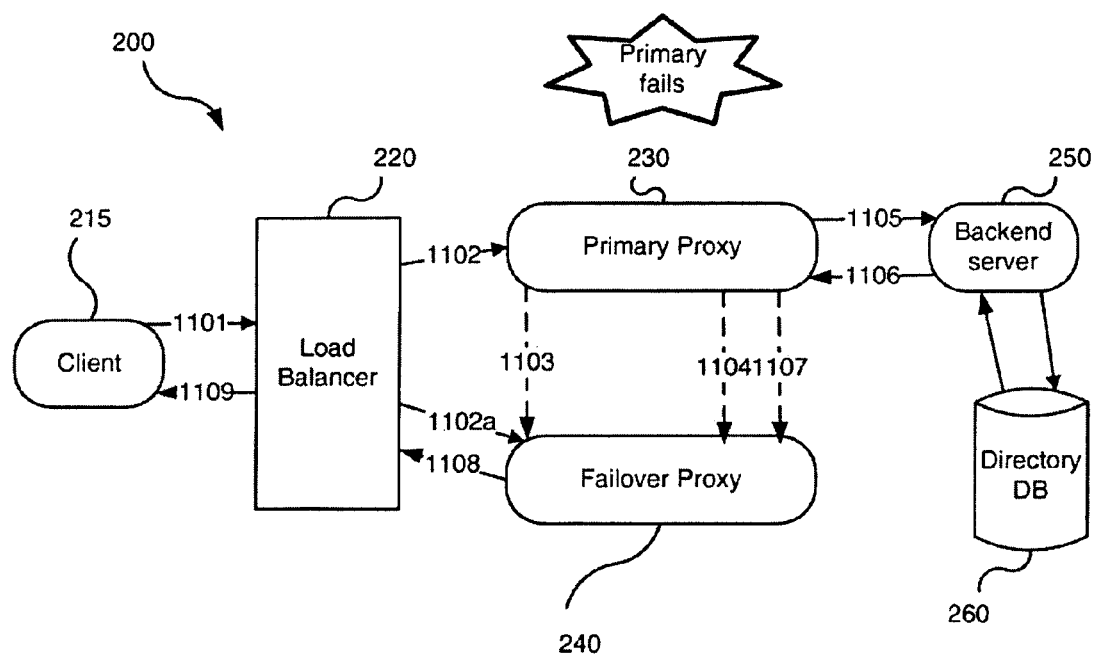
FIG. 11 shows the failover proxy network of FIG. 2 with dataflow under Failure Scenario 4.

FIG. 11 shows an embodiment of the failover proxy network 200 with dataflow under Failure Scenario 4 as implemented by embodiments of the methods 400 to 700 described above. The flow of a request from the client 215 is client 215->load balancer 220→primary proxy 230->backend server 250, as shown by arrows 1101, 1102, and 1105. Primary proxy 230 sends a "New Request" CM and a "Backend Processing" CM to failover proxy 240 as shown by arrows 1103, and 1104. Backend server 250 returns a response to primary proxy 230, as shown by arrow 1106. Primary proxy 230 then fails after sending a "Backend Reply" CM to failover proxy 240 as shown by arrow 1107. This causes load balancer 220 to generate a retry request to the failover proxy 240, which then retrieves and returns the response to the client 215 via the load balancer 220, as shown by arrows 1108 and 1109.

The arrangements for buddy processing and checkpoint messaging disclosed herein can be enabled or disabled at any time.

The following discusses how two proxies can be configured as buddies of each other and gives an example of the same. In the example being discussed here, if two proxies P1 and P2 are to be configured as buddies of each other, P1 will need to have two LDIF entries corresponding to P2 in its configuration file and vice-versa. Examples of these LDIF entries are given below.

LDIF Entries for P2 in the configuration file of P1:

dn: cn=buddyProxy, cn=Configuration
    cn: buddyProxy
    ibm-buddyProxyServerID: <P2-uuid>
    ibm-buddyfProxyUrl: ldap://<Hostname or IP addr>:<port no.>
    buddyProxyBindDN: cn=buddyP1

-continued

```
buddyProxyCredentials: <password1>
objectclass: top
objectclass: ibm-buddyProxyEntry
``` where:
ibm-buddyProxyServerID, ibm-buddyfProxyUrl, buddyProxyBindDN and buddyProxyCredentials are the attributes in objectclass ibm-buddyProxyEntry;
<P2-uuid> is the server ID of proxy P2, which is present in the configuration file of P2;
<Hostname or IP addr> is the Hostname or IP address of the machine on which P2 is running;
<port no.> is the buddy port on which P2 is listening for the checkpoint messages from P1;
cn=buddyP1 is the bind DN process P1 will use to bind to P2;
<password1> is the password P1 will use to bind to P2;
$2^{nd}$ entry in the configuration file of P1:

```
dn: cn=buddyProxyCreds, cn=Configuration
cn: buddyProxyCreds
buddyProxyBindDN: cn=buddyP2
buddyProxyCredentials: <password2>
objectclass: top
``` objectclass: ibm-buddyProxyCredsEntry
where
cn=buddyP2 and <password2> are the bind DN and password P2 will use to bind to P1, respectively.

Note that "cn=buddyProxy, cn=Configuration" entry may be used by P1 to connect and bind to P2 whereas "cn=buddyProxyCreds, cn=Configuration" entry may be used by P1 to accept the connection request from P2. Similar entries need to be present in the configuration file of P2 for proxy P1. Also note that:

1. Values of attributes buddyProxyBindDN and buddyProxyCredentials in the entry "cn=buddyProxy, cn=Configuration" present in P1's configuration file should match with the values of buddyProxyBindDN and buddyProxyCredentials in the entry "cn=buddyProxyCreds, cn=Configuration" present in P2's configuration file respectively.
2. Values of attributes buddyProxyBindDN and buddyProxyCredentials in the entry "cn=buddyProxyCreds, cn=Configuration" present in P1's configuration file should match with the values of buddyProxyBindDN and buddyProxyCredentials in the entry "cn=buddyProxy, cn=Configuration" present in P2's configuration file respectively.

Both proxies P1 and P2 will need to be restarted after these entries are added in their respective configuration files.

The methods described above are for illustration purposes only, and steps may be modified, re-ordered, added, or missing without departing from the scope of this disclosure.

The foregoing describes only some embodiments of the invention, and modifications and/or changes can be made thereto, the embodiments being illustrative and not restrictive.

We claim:

1. A computer system for servicing a request from a client, said system comprising:
a memory for storing instructions;
at least two proxy servers, each proxy server having a corresponding proxy server configured as a buddy proxy server, each proxy server being adapted to act as a primary proxy server for servicing said request and to forward said request to a backend server;
a load balancer adapted to:
forward said request to a primary proxy server, said primary proxy server being configured to send one or more checkpoint messages with status updates to a failover proxy server configured as the buddy proxy server;
forward said request, with a corresponding flag set, to said failover proxy server that is configured as the buddy proxy server to said primary proxy server, in the event of failure of said primary proxy server;
determine, by said backend proxy server on receipt of said request, whether said request matches a previously stored request received as part of a checkpoint message from a buddy proxy server previously engaged in processing said request; and
forward a response from said backend server via said primary proxy server or from said backend server via said failover proxy server to said client; and
a backend server adapted to receive a request from a proxy server and to send a response to said proxy server from which said request was received,
wherein said failover proxy server is adapted to process said request depending on a status in the processing by said primary proxy server of a matching previously stored request.

2. A method of servicing, by a proxy server in a proxy network, a request, said method comprising:
receive said request at a primary proxy server, said primary proxy server being configured to send one or more checkpoint messages with status updates to a failover proxy server configured as the buddy proxy server;
forward said request, with a corresponding flag set, to said failover proxy server that is configured as the buddy proxy server to said primary proxy server, in the event of failure of said primary proxy server;
determining, by said proxy server on receipt of said request, whether said request matches a previously stored request received as part of a checkpoint message from a buddy proxy server previously engaged in processing said request;
receive a response from said backend server at said primary proxy server, and forward said response to said client;
determining, if a match was found, the status in the processing by said buddy proxy server to said proxy server of a matching previously stored request; and
servicing said request depending on said determined status;
determining a failure of the buddy proxy server; and
receiving the request generated in response to the failure.

3. The method of claim 2, wherein said servicing comprises, if said status is that said buddy proxy server failed before forwarding said previously stored request to a backend server:
forwarding said request to said backend server; and
forwarding a response to said request from said backend server to an entity from which said request was received.

4. The method of claim 2, wherein said servicing comprises, if said status is that said buddy proxy server failed after receiving a response to said previously stored request from a backend server:
retrieving said response corresponding to said previously stored request, and
forwarding said response to the entity from which said request was received.

5. The method of claim 2, wherein said servicing comprises, if said status is that said buddy proxy server failed after forwarding the previously stored request to a backend server:
   sending a further request to said backend server to discover the status of said previously stored request; and
   forwarding a response to said further request from said backend server to an entity from which said request was received.

6. The method of claim 2, wherein said status is determined from a type of a most recent checkpoint message corresponding to said previously stored request.

7. The method of claim 2, wherein said matching is determined by comparing an identifier for said request with an identifier of at least one said previously stored request.

8. The method of claim 2, wherein said first determining is conditional on a corresponding flag having been set in said request.

9. The method of claim 2, wherein the determining step further comprises:
   determining, by said proxy server on receipt of said request to a backend server, whether said request matches a previously stored request to said backend server.

10. The method of claim 2, wherein said checkpoint message is a new request checkpoint message sent from the primary proxy server to the buddy proxy server.

11. The method of claim 10, wherein said entity is a load balancer; and
   wherein said match is found by matching a request ID in the new request checkpoint message to the request ID of a retry request from the load balancer.

12. A method of servicing, by a backend server in a proxy network, a request from a failover proxy server, said method comprising:
   receiving at said backend server a request forwarded from a primary proxy server, said a proxy server being configured to send one or more checkpoint messages with status updates to a failover proxy server configured as the buddy proxy server;
   storing said request from the primary proxy server as a retained request;
   receiving a request from the failover proxy server;
   determining, if said request from the failover proxy server is a status discovery request, whether said status discovery request matches a retained request from a primary proxy server associated with said failover proxy server and corresponding response in a retained request list;
   sending, if a match is found, said corresponding response to the entity from which said status discovery request was received;
   determining, if a match is not found, whether said request matches a request in an outstanding request list; and
   sending, if a match is found, a response to said matching request to an entity from which said status discovery request was received.

13. The method of claim 12, further comprising storing, if said request is not a status discovery request, said request in an outstanding request list;
   moving, upon receipt of a response to said request, said request and said received response to a retained list;
   sending said response to said entity from which said status discovery request was received.

14. The method of claim 13, wherein said moving is conditional on a flag having been set in said request.

15. A method of servicing a database change request sent from a client, said method comprising:
   forwarding said request to a primary proxy server, said primary proxy server being configured to send one or more checkpoint messages with status updates to a failover proxy server configured as the buddy proxy server; and
   receiving, at a failover proxy, a new request checkpoint message sent from a primary proxy;
   receiving, at the failover proxy, a retry request from a load balancer in response to the load balancer detecting a failure of the database change request sent to the primary proxy;
   sending a request status extended operation from the failover proxy to a backend server;
   determining, by said proxy server on receipt of said request, whether said request matches a previously stored request received as part of a checkpoint message from a buddy proxy server previously engaged in processing said request;
   receiving, at the failover proxy, a response to the database change request sent from the backend server; and
   forwarding the response to the database change request from the failover proxy to the load balancer.

16. The method of claim 15, further comprising:
   receiving, at the failover proxy, a backend processing request checkpoint message sent from the primary proxy in response to the database change request being forwarded from the primary proxy to the backend server.

17. The method of claim 15, wherein the new request checkpoint message is created by the primary proxy in response to the database change request being received at the primary proxy from a load balancer.

18. The method of claim 15, wherein the database change request is selected from a group consisting of a LDAP ADD request, a DELETE request and a MODIFY request.

19. The method of claim 15, further comprising:
   receiving, at the failover proxy, request ID for said database change request sent from the backend server; and
   sending an ID of said database change request from said failover proxy to the backend server.

20. The method of claim 19, wherein the backend server sends the response to the database change request to the failover proxy in response to the ID of said database change request being received at the backend server.

* * * * *